United States Patent [19]

Cutler

[11] Patent Number: 4,717,229
[45] Date of Patent: Jan. 5, 1988

[54] BI-DIRECTIONAL OPTICAL FIBER COUPLER

[75] Inventor: Albert E. Cutler, Barnett, United Kingdom

[73] Assignee: Communications Patents Limited, London, England

[21] Appl. No.: 780,196

[22] Filed: Sep. 20, 1985

[30] Foreign Application Priority Data

Sep. 21, 1984 [GB] United Kingdom ............... 8423979

[51] Int. Cl.⁴ .................................................. G02B 6/26
[52] U.S. Cl. ............................. 350/96.15; 350/96.16; 350/96.18
[58] Field of Search ............... 350/96.15, 96.16, 96.18, 350/96.20, 96.21, 96.22

[56] References Cited

U.S. PATENT DOCUMENTS

| 4,021,099 | 5/1977 | Kawasaki et al. | 350/96 |
| 4,149,770 | 4/1979 | Milton et al. | 350/96.15 |
| 4,165,914 | 8/1979 | Villarruel et al. | 350/96.16 |
| 4,423,922 | 1/1984 | Porter | 350/96.15 |

OTHER PUBLICATIONS

Grafton et al., "Bi-Directional Fiber-Optic Coupler", Xerox Disclosure Journal, vol. 6, No. 5, Sep./Oct. 1981, pp. 249-252.
Panock et al., "An Experimental Low-Loss Single-Wave Length Bi-Directional Lightwave Link", Journal of Lightwave Technology, vol. LT-2, No. 3, Jun. 84, pp. 300-305.

Primary Examiner—John Lee
Assistant Examiner—John Ngo
Attorney, Agent, or Firm—Laurence R. Brown

[57] ABSTRACT

An optical fiber connector comprises a first fiber one end of which is in abutment with one end of a second optical fiber, the first and second fibers having substantially the same outside diameter and the second fiber having the same core diameter but a higher numerical aperture than the first. A mirror is arranged to focus light transmitted between the end of the second fiber and an optical transducer. The mirror defines an opening through which the first fiber extends.

3 Claims, 1 Drawing Figure

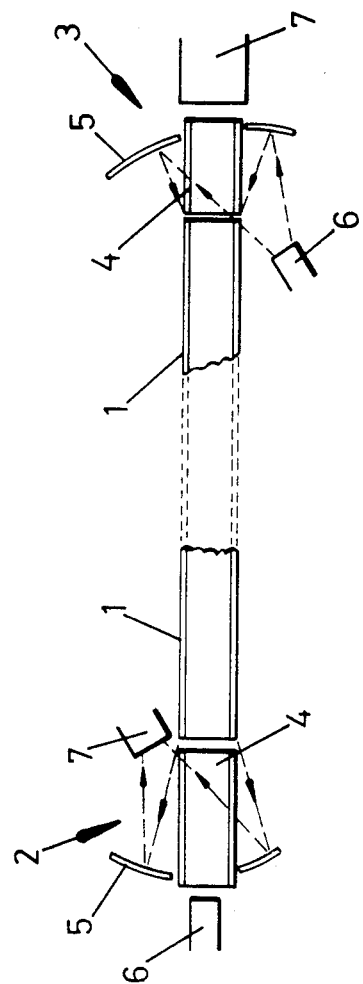

BI-DIRECTIONAL OPTICAL FIBER COUPLER

The present invention relates to an optical fibre connector and to a two-way optical communications link incorporating such a connector.

The advantages of optical fibres over conductive wires in terms of available bandwidth have been known for a considerable period and as fibre manufacturing and handling techniques have improved optical fibres have been used in an ever widening range of installations.

In cable broadcasting networks where for example a large number of television signals are broadcast to many thousands of subscribers the large capacity of optical fibres is clearly an advantage. Unfortunately such networks must be capable of carrying subscriber generated signals such as digital programme selection signals and therefore the cable network must have a two-way capability. This can be done using the techniques pioneered in the telephone system if the network cabling is electrically conductive without adding extra cables to the network as simple tap/splitter circuits are available. In the case of optical fibres however it has proved difficult to provide components which allow reliable two-way communications links to be established. Accordingly optical fibres are generally used to transmit signals in only one direction, parallel optical or conductive links being required to carry return signals.

It is an object of the present invention to provide an optical fibre connector which enables two-way optical fibre communications to be established.

According to the present invention, there is provided an optical communications link comprising a main optical fibre, a pair of secondary optical fibres one end of each of which is in abutment with a respective end of the main fibre, each secondary fibre having the same outside and core diameters as the main fibre but a lower numerical aperture than the main fibre, a first optical source positioned to launch light into the end of one of the secondary fibres remote from the main fibre, a first light detector positioned to receive light from the end of the other secondary fibre remote from the main fibre, a second optical source positioned to launch light into one end of the main fibre through the outer surface of the adjacent secondary fibre, the light launched into the main fibre having propagation angles greater than the maximum propagation angle of the secondary fibre, a second light detector positioned adjacent the end of the main fibre remote from the second optical source, and a mirror positioned to focus light emerging from the outer surface of the secondary fibre adjacent the second light detector onto the second light detector.

Preferably, the mirror is concave, and defines an opening through which the adjacent secondary fibre extends.

Light transmitted from one low numerical aperture secondary fibre along the main optical fibre towards the other secondary fibre consists of low angle rays corresponding to the low numerical aperture secondary fibre into which it was originally launched. This light passes from the main fibre to the other low numerical aperture secondary fibre. The numerical aperture increase at the joint between the fibres ensures that no low angle light is lost and, except for a small loss due to jointing imperfections, the greater part passes into the low numerical aperture secondary fibre and to a receiving transducer. A light source and mirror combination adjacent the end of the main fibre enables signals to be transmitted at angles up to those corresponding to the high numerical aperture of the main fibre back along the main fibre and these escape at the numerical aperture mis-match between the other end of the main fibre and the said one secondary fibre. These are collected by a mirror and applied to a receiving transducer. By providing one transmitter and one detector adjacent at each end of the main fibre two-way communication can be achieved.

It is relatively easy to establish reliable joints between fibres of substantially the same outside diameter and thus the fibres can be connected without any loss of reliability as compared with conventional arrangements. As long as the quality of the fibres is such as to preserve the ray angles within the main fibre there is no significant insertion loss resulting from the deliberate numerical aperture mis-match between the main and secondary fibres, the low angle rays being retained within the low angle (low numerical aperture) fibres and the high angle rays launched into the main fibre at one end escaping when the numerical aperture is reduced at the other.

An embodiment of the present invention will now be described, by way of example, with reference to the accompanying drawing.

The drawing shows a main optical fibre 1 terminated at each end by connectors 2 and 3. Each connector comprises a secondary fibre 4 one end of which is in aligned abutment with the main fibre 1, a concave mirror 5, an optical transmitter 6, and an optical detector 7. The fibres 1 and 4 are of the same outside diameter and core diameter, although the fibre 1 has a higher numerical aperture than the fibres 4.

The mirrors 5 define openings through which the fibres 4 extend and are arranged such that they reflect light between the end of the fibre 1 and the transmitter (connector 3) or detector 7 (connector 2). Thus light from the transmitter 6 of connector 3 is reflected back to the end of the main fibre 1. A proportion of this light falling in the range of angles which lie between that corresponding to the maximum supported by the high numerical aperture fibre and that supported by the low numerical aperture fibre is transmitted along the fibre 1 and then emerges at the other end as a result of the mis-match between the fibres 1 and 4. The emergent light is reflected back to the detector 7 of the connector 2. Light is transmitted at angles corresponding to the low numerical aperture in the other direction directly from the on-axis transmitter 6 of connector 2 via fibres 4, 1 and 4 to the on-axis detector 7 of connector 3. Thus two-way communication is achieved.

The mechanical connections between the fibres and other components can be achieved using conventional devices.

The illustrated arrangement works effectively because of the preservation of the optical launch angle along a fibre and the insensitivity of transmitters to incident light from other sources.

What is claimed is:

1. An optical communications link comprising: a main optical fibre; a pair of secondary optical fibres, one end of each of which is in abutment with a respective end of the main fibre, each secondary fibre having the same outside and core diameters as the main fibre but a lower numerical aperture than the main fibre; a first optical source positioned to launch light into one of the secondary fibres at an end of the secondary fibre remote from the main fibre; a first light detector positioned to receive light from the other secondary fibre at an end of the secondary fibre remote from the main fibre; a second optical source positioned to launch light into one end of the main fibre through an outer surface of the adjacent secondary fibre, the light launched into the main fibre having propagation angles greater than the maximum propagation angle of the secondary fibre; a second light detector positioned adjacent the end of the main fibre remote from the second optical source; and a mirror positioned to focus light emerging from the outer surface of the secondary fibre adjacent the second light detector onto the second light detector.

2. An optical communications link according to claim 1, wherein the mirror is concave.

3. An optical communications link according to claim 2, wherein the mirror includes an opening through which the adjacent secondary fibre extends.

* * * * *